United States Patent
Majumder (10) Patent No.: US 9,660,453 B2
(45) Date of Patent: May 23, 2017

(54) CONTROL OF A MICROGRID (71) Applicant: ABB Schweiz AG, Baden (CH)

(72) Inventor: Ritwik Majumder, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 15/124,091

(22) PCT Filed: Mar. 7, 2014

(86) PCT No.: PCT/EP2014/054494
§ 371 (c)(1),
(2) Date: Sep. 7, 2016

(87) PCT Pub. No.: WO2015/131958
PCT Pub. Date: Sep. 11, 2015

(65) Prior Publication Data
US 2017/0018929 A1  Jan. 19, 2017

(51) Int. Cl.
*H02J 3/38* (2006.01)
*H02J 3/14* (2006.01)
*H02J 3/46* (2006.01)

(52) U.S. Cl.
CPC ............. *H02J 3/381* (2013.01); *H02J 3/14* (2013.01); *H02J 3/46* (2013.01); *H02J 2003/388* (2013.01)

(58) Field of Classification Search
CPC ...... H02J 3/381; H02J 3/46; H02J 3/14; H02J 2003/388

(Continued)

(56) References Cited

U.S. PATENT DOCUMENTS 6,219,623 B1* 4/2001 Wills ................. H02J 3/383
290/40 B
7,116,010 B2  10/2006 Lasseter et al.
(Continued)

FOREIGN PATENT DOCUMENTS

CN  101902146 A  12/2010
CN  102856924 A  1/2013
(Continued)

OTHER PUBLICATIONS

International Preliminary Report on Patentability, Application No. PCT/EP2014/054494, Completed: Jul. 19, 2016; Mailing Date: Jul. 19, 2016, 8 pages.
(Continued)

*Primary Examiner* — Jared Fureman
*Assistant Examiner* — Michael Warmflash
(74) *Attorney, Agent, or Firm* — Whitmyer IP Group LLC (57) ABSTRACT

A method of controlling a microgrid including at least one distributed generator (DG) and arranged for being connected to a power grid, by means of a converter via which the DG is connected in said microgrid. The method includes running the converter in a current control mode for controlling at least one current output of the DG in the microgrid; obtaining an indication that the converter should change from the current control mode towards a voltage control mode for controlling a voltage output of the DG in the microgrid; and entering the converter in an interstate mode, in response to the obtained indication, in which interstate mode the converter is configured for controlling both the current output and the voltage output.

13 Claims, 4 Drawing Sheets (58) Field of Classification Search
USPC .......................................................... 307/24
See application file for complete search history.

(56) References Cited

U.S. PATENT DOCUMENTS

| 8,994,217 | B2* | 3/2015 | Cho | H01M 10/465 307/82 |
|---|---|---|---|---|
| 2006/0004531 | A1* | 1/2006 | Ye | G01R 19/2513 702/60 |
| 2012/0280673 | A1 | 11/2012 | Watanabe et al. | |
| 2013/0046415 | A1* | 2/2013 | Curtis | H02J 3/38 700/297 |
| 2013/0077367 | A1* | 3/2013 | Zhu | H02J 3/16 363/97 |
| 2014/0306526 | A1* | 10/2014 | Fontana | H02J 3/00 307/24 |

FOREIGN PATENT DOCUMENTS

| CN | 203312829 U | 11/2013 |
|---|---|---|
| WO | 2012058114 A2 | 5/2012 |

OTHER PUBLICATIONS

International Search Report and Written Opinion of the International Searching Authority, Application No. PCT/EP2014/054494, Completed: Dec. 19, 2014;Mailing Date: Jan. 13, 2015, 9 pages.
Krishnan G et al: "Control of grid connected and islanding operations of distributed generation systems with seamless transfer between modes", 2013 IEEE International Conference on Control Applications (CCA). Part of 2013 IEEE Multi-Conference on Systems and Control IEEE Piscataway, NJ, USA, 2013,—Aug. 30, 2013 (Aug. 30, 2013), pp. 509-514.
Written Opinion of the International Preliminary Examining Authority, Application No. PCT/EP2014/054494, Mailing Date: Feb. 15, 2016, 5 pages.
Xiaohuan Wang et al: "Weighted control research on seamless transfer for dual-mode three phase inverter in micro-grid", Electrical Machines and Systems (ICEMS), 2011 International Conference On, IEEE, 2011,—Aug. 23, 2011 (Aug. 23, 2011), pp. 1-5.

* cited by examiner

CONTROL OF A MICROGRID

TECHNICAL FIELD

The present disclosure relates to methods and devices for controlling a microgrid comprising at least one distributed generator (DG) which is connected in said microgrid via a converter.

BACKGROUND

A microgrid is a localized grouping of electricity generation, energy storage, and loads that normally operates connected to a traditional centralized grid (macrogrid) via a point of common coupling (PCC). This single point of common coupling with the macrogrid can be disconnected, islanding the microgrid. Microgrids are part of a structure aiming at producing electrical power locally from many small energy sources, DGs. In a microgrid, a DG is connected via a converter which controls the output of the DG, i.e. the current injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and the microgrid is islanded.

During islanding, there is a risk of imbalance in the microgrid due to the loss of power import from grid as well as loss of voltage control by the grid. For voltage control it is required to change control mode of the DGs. The power balancing is solved by fast storage action and immediate load shedding schemes.

The change in control mode of the DGs is from current source to voltage source operation and is initiated to create the voltage and frequency reference for the microgrid without presence of the macrogrid.

This switchover from one mode to another is initiated by island detection and thus the set point tracking of the converters depend on the island detection time, mode change signal and settling time of the primary control loop.

One of the major drawback in sudden loss of grid connection following an abrupt change in control mode may lead to high rate of discharge (or charge) in storage which may cause tripping leading to a major power imbalance and stability problems.

CN 101 902 146 is a regular Chinese application which appears to disclose an inverter in a microgrid, which inverter is controlled as a current source when connected to an electrical network and as a voltage source in island operation.

SUMMARY

It is an objective of the present invention to provide an improved method of controlling a microgrid by using both current control and voltage control of a converter therein.

According to an aspect of the present invention, there is provided a method of controlling a microgrid comprising at least one DG and arranged for being connected to a power grid. The controlling is by means of a converter via which the DG is connected in said microgrid. The method comprises running the converter in a current control mode for controlling at least one current output of the DG in the microgrid, typically based on a reference output current and not on a reference output voltage. The method also comprises obtaining an indication that the converter should change from the current control mode towards a voltage control mode for controlling a voltage output of the DG in the microgrid. The method also comprises entering the converter in an interstate mode, in response to the obtained indication, in which interstate mode the converter is configured for controlling both the current output (typically based on the reference output current) and the voltage output (typically based the reference output voltage).

According to another aspect of the present invention, there is provided a method of controlling a microgrid comprising at least one DG and arranged for being connected to a power grid. The controlling is by means of a converter via which the DG is connected in said microgrid. The method comprises running the converter in a voltage control mode for controlling at least one voltage output of the DG in the microgrid, e.g. based on a reference output voltage and not on a reference output current. The method also comprises obtaining an indication that the converter should change from the voltage control mode towards a current control mode for controlling a current output of the DG in the microgrid. The method also comprises entering the converter in an interstate mode, in response to the obtained indication, in which interstate mode the converter is configured for controlling both the current output (typically based on the reference output current) and the voltage output (typically based the reference output voltage).

According to another aspect of the present invention, there is provided a control unit for controlling an output of a DG connected to a microgrid via a converter. The control unit comprises processor circuitry, and a storage unit storing instructions that, when executed by the processor circuitry, cause the control unit to run the converter in a current control mode for controlling at least one current output of the DG in the microgrid. The instructions also cause the control unit to obtain an indication that the converter should change from the current control mode towards a voltage control mode for controlling a voltage output of the DG in the microgrid. The instructions also cause the control unit to enter the converter in an interstate mode, in response to the obtained indication, in which interstate mode the converter is configured for controlling both the current output and the voltage output in the microgrid.

According to another aspect of the present invention, there is provided an electrical converter comprising or otherwise associated with an embodiment of a control unit of the present disclosure.

According to another aspect of the present invention, there is provided an electrical microgrid comprising at least one DG, at least one load, an electrical converter via which the DG is connected, and an embodiment of a control unit of the present disclosure.

According to another aspect of the present invention, there is provided a computer program product comprising a computer readable means holding computer-executable components for causing a control unit to perform an embodiment of a method of the present disclosure when the computer-executable components are run on processor circuitry comprised in the control unit.

According to another aspect of the present invention, there is provided a computer program comprising computer program code which is able to, when run on processor circuitry of a control unit, cause the control unit to perform an embodiment of a method of the present disclosure.

By means of the interstate mode, the control of the microgrid is improved, compared with switching directly between only current control and only voltage control. In accordance with embodiments of the present invention, it is possible to move from pure voltage or current control to the interstate mode where both voltage and current control is used, and possibly then move back again to pure voltage or current control. In current control mode, the converter may try to inject max available power by calculating a reference current based on the microgrid voltage and track that reference current. In voltage control mode, the converter may try to track a reference voltage. But in some converter control approaches, based on the voltage error inside a converter control, a current reference is generated and then the inner current control loop track that current. As a result, the converter able to produce the desired output voltage and inject the power may be required to do that. A difference between voltage and current control is that in current control mode the output current of the converter or DG is controlled while in voltage control mode the output voltage is controlled (regardless of any inner current control loop or not).

Advantages of embodiments of the present invention include e.g.:

more stable grid connected microgrid solutions during islanding, disturbances and weak macrogrid conditions, that a smoother changeover between the modes provides reliable solutions for facilitating a microgrid with sensitive loads, that it avoids high change in storage followed by shut down since the storage tries to inject reactive and real power based on voltage and frequency to support the grid, which will reduce the discharge rate requirement on the storage, and/or that a tighter voltage regulation is possible in weak macrogrid conditions with one or multiple sources oscillating between the control modes smoothly and in the interstate mode.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
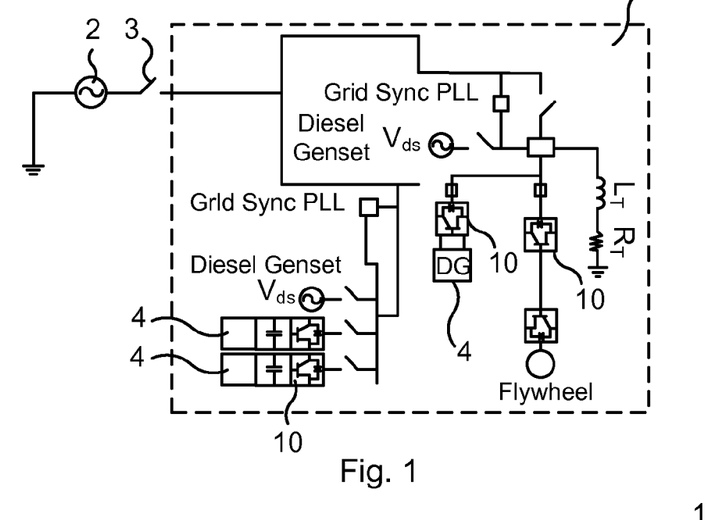
FIG. 1 is a schematic circuit diagram of an embodiment of a microgrid in accordance with the present invention.

FIG. 1 shows an example of a microgrid 1 with which embodiments of the present invention may be used. The microgrid 1 is connected to a power grid 2, herein also called a macrogrid 2 to distinguish it from the microgrid 1, via a switch or circuit breaker 3. When the circuit breaker 3 is opened, e.g. due to a fault in the macrogrid 2 or the microgrid 1, the microgrid is islanded and is no longer affected by the voltage of the macrogrid 2. The microgrid 1 comprises a plurality of distributed generators (DG) 4, connected in the microgrid via a converter 10. However, not all DG may need to be connected via a converter 10, e.g. the Diesel gensets (Diesel generators) in FIG. 1. Another example of a DG 4 in FIG. 1 is a flywheel which is an energy storage which may act as a generator when injecting power into the microgrid 1. However, typical DG 4 include wind and solar power generators etc. There is also at least one phase-locked loop (PLL) grid synchronization unit. A converter 10 is used to control the current injected into the microgrid 1 by the DG 4 which is connected via the converter 10. The microgrid may also comprise one or more loads, which in the figure is illustrated by the R and L branch of the circuit. In normal, connected, mode, the microgrid 1 is connected to the macrogrid 2 via the circuit breaker 3 and provides power to the macrogrid 2 produced by the DGs 4. Similarly, if the power produced by the DGs 4 are not enough for the loads (if any) in the microgrid 1, the macrogrid 2 may provide power to the microgrid 1. Typically, unless the power exchange with the macrogrid 2 is small, the voltage in the microgrid 1 is controlled by the system voltage of the macrogrid 2. However, if the circuit breaker 3 is open, disconnecting the microgrid from the macrogrid, the microgrid is in island mode and the voltage of the microgrid is not affected by the macrogrid voltage. Thus, the microgrid 1 has to control its own voltage when in island mode.

Figure 2:
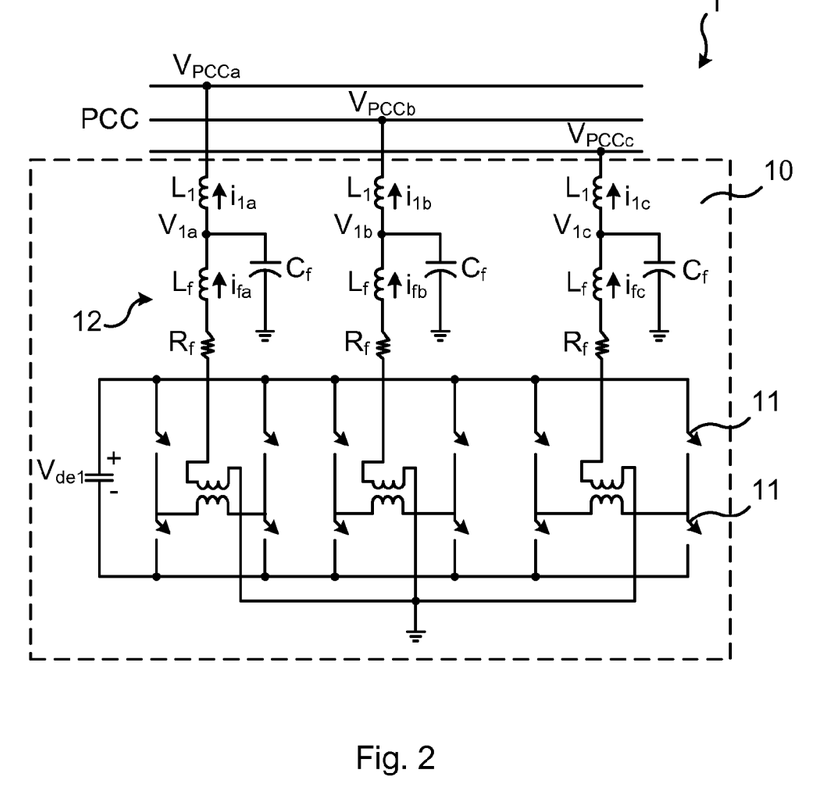
FIG. 2 is a schematic circuit diagram of an embodiment of a converter in accordance with the present invention.

FIG. 2 shows an example embodiment of a converter 10 of the present invention. Power generated by a DG 4 is injected into the three phases a, b and c of the microgrid 1 via the converter 10 at points of common couplings (PCC). The Voltages at the PCC of each phase are referred to as $V_{PCCa}$, $V_{PCCb}$ and $V_{PCCc}$. The converter 10 comprises H-bridges connected to each phase with switches 11 for converting the direct current (DC) power (with the voltage $V_{dc1}$ shown in the figure) generated by the DG to the alternating current (AC) power injected into the microgrid. The converter 10 may also comprise a filter 12 positioned between the H-bridges and the PCCs. The filter currents of the respective phases are denoted $i_{fa}$, $i_{fb}$ and $i_{fc}$, respectively, and the output currents injected at the PCCs are denoted $i_{1a}$, $i_{1b}$ and $i_{1c}$ while the output voltage is denoted $V_{1a}$, $V_{1b}$ and $V_{1c}$. it should be noted that any other converter structure may be used with the present invention, e.g. cascaded H-bridges for each phase, or half-bridges in stead of H-bridges (full-bridges). Also, the converter may be for any number of phases, e.g. for a one-phase system instead of a three-phase system.

Figure 3:
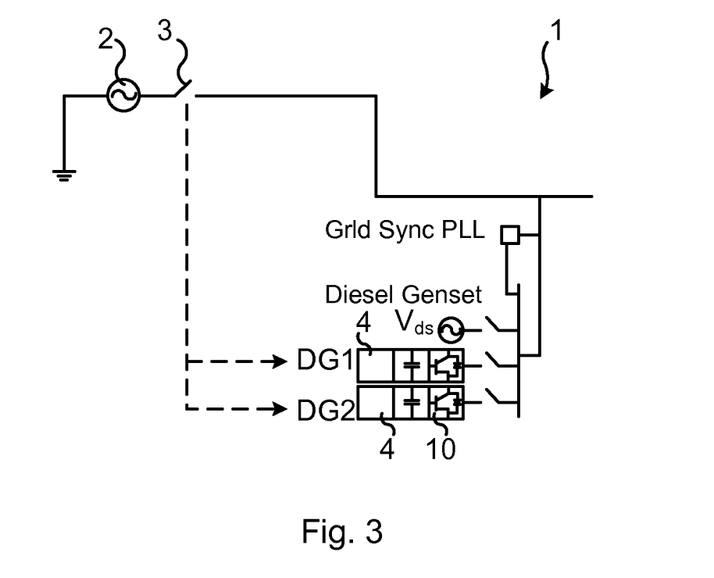
FIG. 3 is a schematic illustration of island detection in an embodiment of a microgrid in accordance with the present invention.
Figure 4:
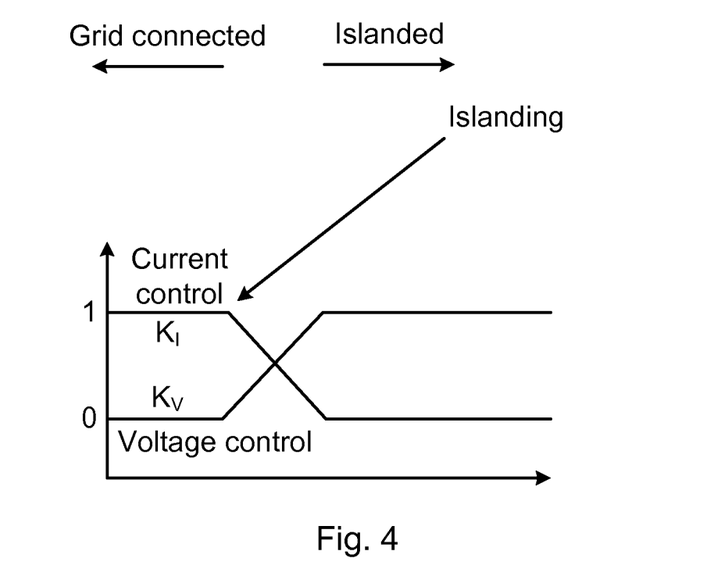
FIG. 4 is a schematic graph illustrating a switching from current control mode to voltage control mode of an embodiment of a converter due to islanding, in accordance with the present invention.

In some embodiments of the present invention, the switching of control mode of the converter 10 is due to detection of islanding, as illustrated by FIG. 3. When it is detected that the grid connection switch 3 is open, islanding the microgrid 1, a signal/indication of this is sent to the control units of the converters 10 in the microgrid 1. Each converter 10 may comprise its own control unit 20 (see also FIG. 6), but it is also conceivable that the same control unit may be comprised in and control more than one converter 10. Typically, the converter will be operating in current control mode when the microgrid is connected to the macrogrid 2, but when the control unit receives the indication of islanding, it is prompted to move into the interstate mode where also the voltage is controlled. In the interstate mode, the converter is controlled based on both current and voltage (state control), typically by means of a state matrix where the current control and voltage control parts are weighted relative to each other. This is illustrated by the graph in FIG. 4. FIG. 4 shows that before islanding the converter 10 is controlled based only on current, i.e. the current control weight in the state matrix is 1 and the voltage control weight is 0. Then, when islanding has been detected and the control of the converter is switched to the interstate mode, the weight of the current control is reduced to between 1 and 0 while the weight of the voltage control is increased to between 0 and 1. In some embodiments, the interstate mode comprises dynamically assigning different weights to the controlling of the current and the controlling of the voltage in relation to each other. In accordance with the embodiment of FIG. 4, the weight of the current control is linearly reduced from 1 to 0 while the weight of the current control is linearly increased from 0 to 1 until the control is only voltage based. This gives a smooth transition from current control to voltage control, in contrast to the abrupt switch which is currently used. It should be noted that a corresponding interstate mode may similarly be used when moving from current control to voltage control, where the weight of the voltage control is reduced from 1 to 0 while the weight of the current control is increased from 0 to 1. It should also be noted that the control may in some embodiments remain for a prolonged time or indefinitely in the interstate mode. In some embodiments there may be no transition between only current and only voltage control, but rather the control may move from current control to the interstate mode and then back to current control, or from voltage control to the interstate mode and then back to voltage control. The interstate mode is when there is a mix of both current and voltage control, in contrast to the current control mode where the converter is controlled based on only current and to the voltage control mode where the converter is controlled based on only voltage.

Figure 5:
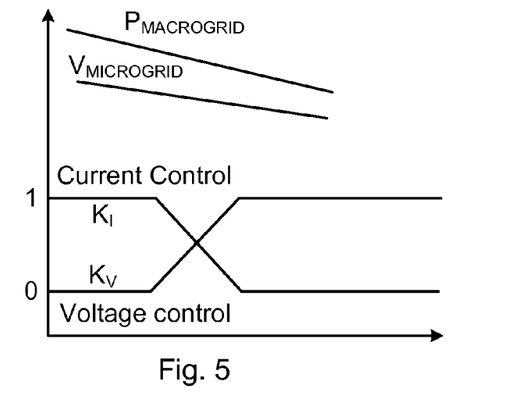
FIG. 5 is a schematic graph illustrating a switching from current control mode to voltage control mode of an embodiment of a converter due to reduced power import from the macrogrid, in accordance with the present invention.

In another embodiment of the present invention, the entry into the interstate mode is due to a low power import from the macrogrid 2. If the power exchange between the microgrid 1 and the macrogrid 2 ($P_{MACROGRID}$) is low, then the affect of the macrogrid voltage on the microgrid voltage ($V_{MICROGRID}$) may be reduced and give rise to a situation which is similar to islanding even if the grid switch 3 is in its closed position. Thus, the microgrid may need to move to increased voltage control, as illustrated in FIG. 5. Another alternative, is that the indication which prompts the move into the interstate mode is an indication of a voltage drop in the microgrid 1, regardless of the cause of such a voltage drop.

Figure 6:
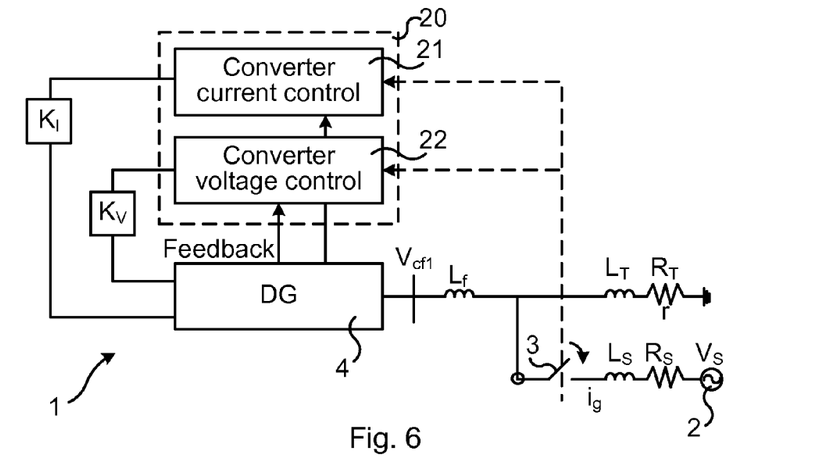
FIG. 6 is a schematic logical block diagram illustrating control of an embodiment of a converter, in accordance with the present invention.

FIG. 6 is a schematic block diagram of a part of an embodiment of a microgrid 1, in accordance with the present invention. In particular, the control unit 20, which is part of the converter 10 controlling the output of the DG 4, is schematically shown. The control unit 20 comprises a current control module 21 and a voltage control module 22. As discussed above, when the control unit 20 receives the indication of islanding (or low power import) it moves into the interstate mode in which the converter is controlled based on a current output reference in accordance with the weight $K_I$ assigned to the current control at that time in the interstate mode and based on a voltage output reference in accordance with the weight $K_V$ assigned to the voltage control at that time in the interstate mode.

Figure 7:
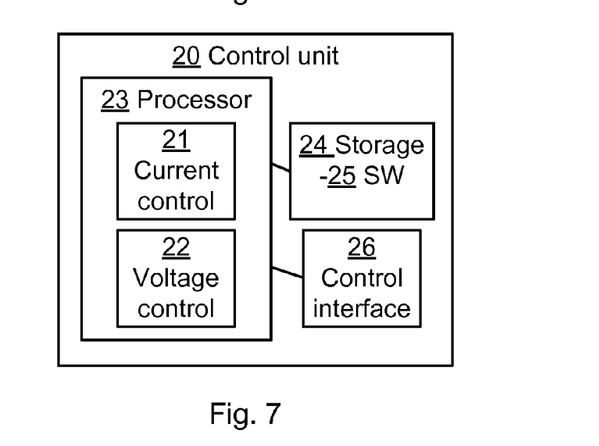
FIG. 7 is a schematic block diagram of an embodiment of a control unit of the present invention.

FIG. 7 is a schematic block diagram of an embodiment of a control unit 20 in accordance with the present invention. The control unit 20 comprises processor circuitry 23 e.g. a central processing unit (CPU). The processor circuitry 23 may comprise one or a plurality of processing units in the form of microprocessor(s). However, other suitable devices with computing capabilities could be comprised in the processor circuitry 23, e.g. an application specific integrated circuit (ASIC), a field programmable gate array (FPGA) or a complex programmable logic device (CPLD). The processor circuitry 301 is configured to run one or several computer program(s) or software (SW) 25 stored in a storage 24 of one or several storage unit(s) e.g. a memory. The SW 25 may e.g. include computer programs for implementing the current control unit 21 and the voltage control unit in the processor circuitry 23 when the computer programs are run on said processor circuitry 23. Alternatively, the computer programs run on the processor circuitry 23 are stored elsewhere. The storage unit is regarded as a computer readable means as mentioned herein and may e.g. be in the form of a Random Access Memory (RAM), a Flash memory or other solid state memory, or a hard disk, or be a combination thereof. The processor circuitry 23 may also be configured to store data in the storage 24, as needed. The control unit 20 may also comprise a control interface 26 for controlling the converter 10 in accordance with the current and/or voltage control modules 21 and 22, e.g. for controlling the opening and closing of the switches 11 of the converter 10.

Figure 8:
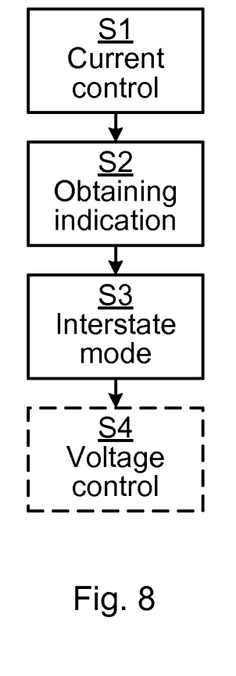
FIG. 8 is a schematic flow chart of embodiments of a method of the present invention.

FIG. 8 is a schematic flow chart of an embodiment of a method of the present invention. The method is for controlling the microgrid 1 comprising at least one DG 4 and arranged for being connected to a power grid/macrogrid 2, by means of a converter 10 via which the DG is connected in said microgrid 1. The method may e.g. be performed by a control unit 20 or any other part of the converter 10. The control unit controls the converter 10 to run S1 in a current control mode for controlling at least one current output (e.g. a current $i_1$ injected into the PCC of the microgrid, a filter 12 current $i_f$ and/or a current through a capacitor $C_f$ of the filter 12 (see FIG. 2)) of the DG 4 in the microgrid 1 based on a reference output current and not based on a reference output voltage. The control unit obtains an indication (e.g. detected islanding) that the converter 10 should change from the current control mode towards a voltage control mode for controlling a voltage output of the DG 4 in the microgrid 1.

In response to the received S2 indication, the control unit 20 controls the converter 10 to enter S3 an interstate mode, in which interstate mode the converter is configured for controlling both the current output based on the reference output current and the voltage output (e.g. an output voltage of the converter 10 at a PCC of the converter) based the reference output voltage, i.e. for a mixture of current control and voltage control. Optionally, the control unit 20 may then control the converter 10 to enter S4 the voltage control mode for controlling the voltage output of the DG 4 in the microgrid 1 based on the reference output voltage and not on the reference output current.

Figure 9:
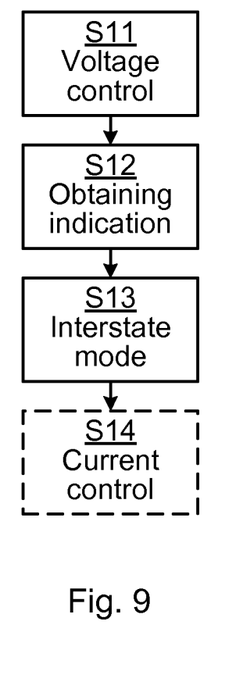
FIG. 9 is a schematic flow chart of other embodiments of a method of the present invention.

FIG. 9 similarly illustrates an embodiment of the method, which starts from the voltage control mode. The method is for controlling the microgrid 1 comprising at least one DG 4 and arranged for being connected to a power grid/macrogrid 2, by means of a converter 10 via which the DG is connected in said microgrid 1. The method may e.g. be performed by a control unit 20 or any other part of the converter 10. The control unit controls the converter 10 to run S1 in a voltage control mode for controlling at least one voltage output of the DG 4 in the microgrid 1 based on a reference output voltage and not based on a reference output current. The control unit obtains an indication (e.g. regained macrogrid connection) that the converter 10 should change from the voltage control mode towards a current control mode for controlling a current output of the DG 4 in the microgrid 1. In response to the received S2 indication, the control unit 20 controls the converter 10 to enter S3 an interstate mode, in which interstate mode the converter is configured for controlling both the current output based on the reference current and the voltage output based the reference output voltage, i.e. for a mixture of current control and voltage control. Optionally, the control unit 20 may then control the converter 10 to enter S4 the current control mode for controlling the current output of the DG 4 in the microgrid 1 based on the reference output current and not on the reference output voltage.

EXAMPLE

As discussed herein, the interstate mode may comprise using a state matrix for the plurality of controlled parameters (current(s) and voltage(s)). Above, situations in which the current control relates to only one current (per phase) and one voltage (per phase), but any number of parameters may be included in the state matrix. If e.g. one voltage and two currents are included in the state matrix, each may e.g. have a weight of ⅓, or any other weighting, in the interstate mode.

The transposed state matrix (vector) $x^T$ may e.g. be defined as:

$$x^T = [v_1 i_{fc} i_1]$$

wherein $v_1$ is the output voltage at the PCC, $i_{fc}$ is the filter current, and $i_1$ is the current injected into the PCC (cf. FIG. 2).

Once the references for the state vector are obtained, the control law $u_c$ may be computed from:

$$u_c = -K(x - x^*)$$

wherein K is the gain matrix and $x^*$ is the reference vector. The gain matrix may be obtained through linear quadratic regulator (LQR) design. From $u_c$ the switching function of the switches 11 in the converter 10 is generated.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of controlling a microgrid comprising at least one distributed generator, DG, and arranged for being connected to a power grid, by means of a converter via which the DG is connected in said microgrid, the method comprising:
    obtaining an indication of a voltage drop in the microgrid; and
    running the converter in an interstate mode, in response to the obtained indication, in which interstate mode the converter is configured for controlling both at least one current output and a voltage output;
    wherein the interstate mode comprises dynamically assigning different weights to the controlling of the current output and the controlling of the voltage output in relation to each other, and
    wherein the obtaining an indication comprises obtaining an indication that the power import to the microgrid from the power grid is below a predetermined threshold, and
    wherein the converter remains in the interstate mode for a prolonged time or indefinitely.

2. The method of claim 1, further comprising:
    before the obtaining, running the converter in a current control mode for controlling the at least one current output of the DG in the microgrid; and
    following the interstate mode, entering the converter in a voltage control mode for controlling the voltage output of the DG in the microgrid.

3. The method of claim 1, further comprising:
    before the obtaining, running the converter in a current control mode for controlling the at least one current output of the DG in the microgrid; and
    following the interstate mode, returning the converter to the current control mode.

4. The method of claim 1, wherein the dynamically assigning different weights comprises linearly decreasing the weight of the controlling of the current and correspondingly linearly increasing the weight of the controlling of the voltage.

5. The method of claim 1, wherein the at least one current output is an output current of the converter which is injected into the microgrid, a filter current within the converter and/or a current through a capacitor of the filter.

6. The method of claim 1 wherein the voltage output is an output voltage of the converter at a point of common coupling (PCC) of the converter.

7. A control unit for controlling an output of a DG connected to a microgrid via a converter, the control unit comprising:
    processor circuitry; and
    a storage unit storing instructions that, when executed by the processor circuitry, cause the control unit to:
    obtain an indication of a voltage drop in the microgrid; and
    running the converter in an interstate mode, in response to the obtained indication, in which interstate mode the converter is configured for controlling both at least one current output and a voltage output in the microgrid;
    wherein the interstate mode comprises dynamically assigning different weights to the controlling of the current output and the controlling of the voltage output in relation to each other, and wherein obtaining an indication comprises obtaining an indication that the power import to the microgrid from the power grid is below a predetermined threshold, and wherein the converter remains in the interstate mode for a prolonged time or indefinitely.

8. The control unit of claim 7, further comprising:

a current control module for the current control of the converter; and a voltage control module for the voltage control of the converter.

9. An electrical converter comprising a control unit including:

a processor circuitry; and a storage unit storing instructions that, when executed by the processor circuitry, cause the control unit to:

obtain an indication of a voltage drop in the microgrid; and running the converter in an interstate mode, in response to the obtained indication, in which interstate mode the converter is configured for controlling both at least one current output and a voltage output in the microgrid;

wherein the interstate mode comprises dynamically assigning different weights to the controlling of the current output and the controlling of the voltage output in relation to each other, and wherein obtaining an indication comprises obtaining an indication that the power import to the microgrid from the power grid is below a predetermined threshold, and wherein the converter remains in the interstate mode for a prolonged time or indefinitely.

10. An electrical microgrid comprising:

at least one DG;

at least one load;

an electrical converter via which the DG is connected; and a control unit of claim 7.

11. A computer program product comprising a non-transitory computer readable means holding computer-executable components for causing a control unit to perform the method of controlling a microgrid of claim 1 when the computer-executable components are run on processor circuitry comprised in the control unit.

12. The computer program of claim 11, comprising a computer program code which is able to, when run on a processor circuitry of a control unit, cause the control unit to perform a method of controlling a microgrid including:

obtaining an indication of a voltage drop in the microgrid; and running the converter in an interstate mode, in response to the obtained indication, in which interstate mode the converter is configured for controlling both at least one current output and a voltage output;

wherein the interstate mode comprises dynamically assigning different weights to the controlling of the current output and the controlling of the voltage output in relation to each other, and wherein the obtaining an indication comprises obtaining an indication that the power import to the microgrid from the power grid is below a predetermined threshold, and wherein the converter remains in the interstate mode for a prolonged time or indefinitely.

13. The electrical converter of claim 9, comprising a control unit including:

a current control module for the current control of the converter; and a voltage control module for the voltage control of the converter.

* * * * *